Patented Feb. 20, 1951

2,542,869

UNITED STATES PATENT OFFICE 2,542,869

N-PYRIDOXYL-AMINO ACIDS AND PROCESS OF PREPARING THE SAME

Dorothea Heyl Hoffman, Rahway, N. J., assignor to Merck & Co., Inc., Rahway, N. J., a corporation of New Jersey No Drawing. Application March 19, 1948, Serial No. 15,971

11 Claims. (Cl. 260—297)

This invention is concerned generally with the novel derivatives of pyridoxal (2-methyl-3-hydroxy-4 - formyl - 5 - hydroxymethyl - pyridine). More particularly, it relates to N-pyridoxyl substituted amino acids and to the salts and esters thereof, and to the preparation of these compounds by condensing pyridoxal with salts or esters of amino acids and hydrogenating the Schiff base thus produced. The novel N-pyridoxyl-amino acids, as well as the salts and esters thereof, and in particular those derived from naturally occurring optically active amino acids, are useful as growth-promoting agents.

These N-pyridoxyl-amino acids may be chemically represented as follows:

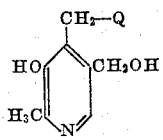

wherein Q is a radical selected from the class which consists of radicals which are obtained by removing one of the hydrogens attached to an amino grouping of naturally occurring amino acids and the corresponding racemic acids. Examples of these N-pyridoxyl-amino acids are: N-pyridoxyl-dl-aspartic acid, N-pyridoxyl-l-glutamic acid, N-pyridoxyl-d-asparagine, N-pyridoxyl-l-lysine, N-pyridoxyl-dl-methionine, N-pyridoxyl-l-leucine, N-pyridoxyl-dl-serine, N(α)-pyridoxyl-N-(ε)-benzoyl-dl-lysine, N-pyridoxyl-l-tyrosine, N-pyridoxyl-dl-phenyl-alanine, N-pyridoxyl-dl-α-alanine, N-pyridoxyl-glycine, N-pyridoxyl-dl norleucine, N-pyridoxyl-dl-leucine, N-pyridoxyl-dl-isoleucine, N-pyridoxyl-dl-valine, N-pyridoxyl-dl-tryptophane, N-pyridoxyl-dl-threonine, and the like.

The novel growth-promoting properties characteristic of the foregoing N-pyridoxyl-amino acids are likewise shown by the salts and alkyl esters of said N-pyridoxyl-amino acids, such as ethyl N-pyridoxyl-dl-aspartate dihydrochloride, N-pyridoxyl-dl-alanine hydrochloride, ethyl N-pyridoxyl-dl-glutamate dihydrochloride, ethyl N-pyridoxyl-dl-alanine dihydrochloride, N-pyridoxyl-l-leucine hydrochloride, ethyl N-pyridoxyl-dl-aspartate, ethyl N-pyridoxyl-dl-glutamate, ethyl N-pyridoxyl-dl-alanine, potassium N-pyridoxyl-dl-phenyl alanine, potassium N-pyridoxyl-l-tyrosine, sodium N-pyridoxyl-dl-valine, sodium N-pyridoxyl-dl-methionine, and the like.

I have discovered that these N-pyriodoxyl-amino acids can be prepared by reacting pyridoxal with an alkali metal salt or ester, preferably a lower alkyl ester, of the appropriate amino acid to form a Schiff base which is then hydrogenated to produce the corresponding N-pyridoxyl-amino acid derivative. This reaction may be chemically represented, employing a metal salt or lower alkyl ester of tryptophane as one of the reactants, as follows:

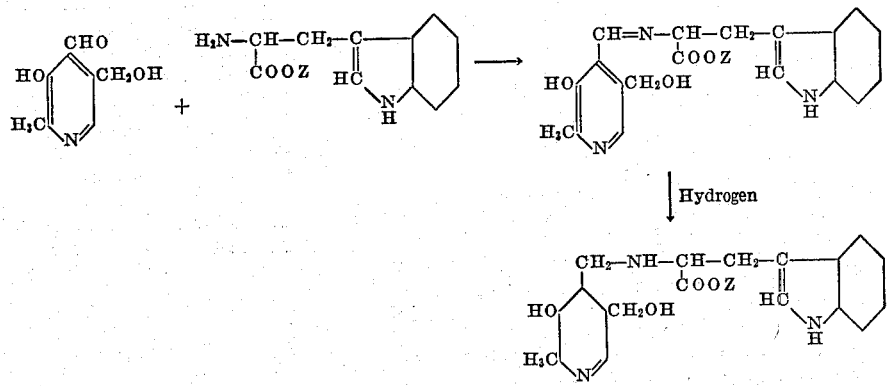

wherein Z is a radical of the class which consists of alkali metal and alkyl radicals.

It is a critical feature of the present invention that, in order to obtain a Schiff base primary condensation product such as those described above, it is necessary to react the pyridoxal with either a metal salt or an ester of the appropriate amino acid. The free amino acids themselves do not react with pyridoxal to produce the Schiff base intermediate. In fact, when pyridoxal is reacted with a free amino acid such as glutamic acid, at elevated temperatures, a transamination reaction occurs with the production of pyridoxamine and α-keto-glutaric acid.

The reaction between pyridoxal and the alkali metal salt or alkyl ester of the amino acid is conveniently conducted at approximately room temperature in a medium comprising a lower aliphatic alcohol such as ethanol, methanol, and the like, whereby the Schiff base is formed in substantially quantitative yield. The reaction ordinarily takes place immediately, or within a few minutes of bringing the reactants together in solution. When it is desired to isolate the Schiff base, however, it may be desirable to allow the reaction to proceed for a longer time, particularly if the product is recovered by direct crystallization from the reaction mixture. When pyridoxal is condensed with an alkali metal salt of an amino acid, as for example, the potassium or sodium salt, the product obtained is the corresponding alkali metal salt of the Schiff base. This salt may be isolated as such by evaporating the reaction mixture to dryness, or by fractional crystallization thereof. Alternatively, the alkali metal salt of the Schiff base can be treated with an acid to form the free carboxylic acid. When pyridoxal is reacted with an alkyl ester of an amino acid, the product is the corresponding alkyl ester of the Schiff base which may be isolated, if desired by evaporation of the reaction mixture.

The resulting alkyl ester or alkali metal salt of the Schiff base can then be reacted with hydrogen in contact with a hydrogenation catalyst to produce the corresponding N-pyridoxyl-amino acid ester or metal salt. It is ordinarily preferred, however, not to isolate the Schiff base compound but instead to react the alcoholic reaction solution, containing the metal salt or ester of the Schiff base directly with hydrogen in contact with a hydrogenation catalyst such as a platinum metal catalyst. The hydrogenation, whichever of the foregoing procedures is employed, is usually complete in less than about ten minutes although occasionally a longer time of about 1 hour may be required. The catalyst is then removed from the hydrogenation mixture by filtering and the resulting alcoholic solution is evaporated to produce the corresponding salt or ester of the desired N-pyridoxyl-amino acid. This product can be purified by recrystallization from a solvent, such as a lower aliphatic alcohol. Alternatively, this product can be treated with an acid to produce either the N-pyridoxyl-amino acid per se, or the corresponding amine salt, such as the hydrochloride of said N-pyridoxyl-amino acid.

The foregoing procedure has been found generally applicable for producing N-pyridoxyl-amino acids corresponding to the known naturally-occurring amino acids with the exception of histidine, and β-mercapto-α-amino aliphatic carboxylic acids. When an amino acid of the latter group is employed, the reaction is conveniently conducted at approximately room temperature by bringing together in aqueous solution pyridoxal and an alkali metal salt of the amino acid, preferably the potassium salt thereof. The almost clear solution which results may be further clarified by filtration and the corresponding alkali metal salt of the pyridoxal amino acid condensation product precipitated from the aqueous filtrate by diluting said filtrate with a water miscible lower aliphatic alcohol, such as ethanol. The metal salt is then treated with an aqueous mineral acid solution to produce the free pyridoxal-amino acid. The pyridoxal-amino acid condensation products obtained utilizing histidine and α-amino-β-mercapto aliphatic carboxylic acids do not show the yellow color characteristic of the Schiff base obtained utilizing other naturally-occurring amino acids, and do not absorb hydrogen when treated therewith in contact with a hydrogenation catalyst. Moreover, they possess growth-promoting properties similar to those characteristic of vitamin B6. These compounds, pyridoxal-histidine (compound 1, below) and the condensation products of pyridoxal with α-amino-β-mercapto aliphatic carboxylic acids (compound 2, below), may be chemically represented as follows:

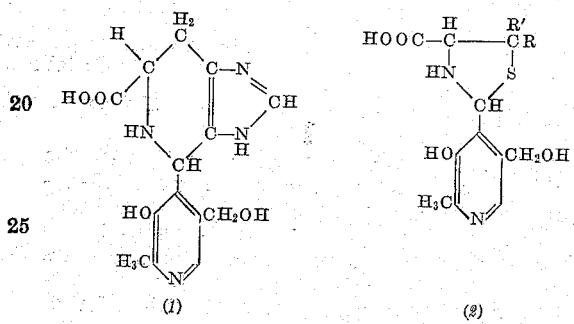

wherein R and R' are of the class consisting of lower alkyl radicals and hydrogen.

All of these products are capable of reaction with diazonium salts like benzene diazonium hydroxide to produce azo compounds which are useful as dyes or dye intermediates.

The following examples illustrate methods of carrying out the present invention, but it is to be understood that these examples are given by way of illustration and not of limitation.

*Example 1*

10 gms. of dl-phenylalanine are suspended in 250 cc. of absolute methyl alcohol, and 3.90 g. of potassium hydroxide are added. The suspension is stirred until the acid has dissolved; then 10.12 g. of pyridoxal is added. The dark yellow solution is clear in less than three minutes. The solution is filtered, diluted to 300 cc. with methyl alcohol and shaken under 2-3 atmospheres of hydrogen with 0.3 g. of Adams' platinum catalyst. The theoretical amount of hydrogen is absorbed in approximately 7 minutes. After removal of the catalyst, the colorless solution can be evaporated, if desired, to produce potassium N-pyridoxyl-dl-phenylalanine. Alternatively, the solution, cooled in an ice-bath, is treated with alcoholic hydrogen chloride until the pH is about 6. After further cooling, the thick precipitate is filtered and the filter cake washed with methyl alcohol and ether. The crystals of N-pyridoxyl-dl-phenylalanine are suspended in icewater, well mixed, filtered, washed with water until the washings are free of chloride ion, then washed with alcohol and with ether, and finally dried to constant weight in a vacuum dessicator to produce approximately 17.8 g. of N-pyridoxyl-dl-phenylalanine; M. P. 233.5–234.0° C., with dec.; yield approximately 93% of theory. Anal. Calc'd for $C_{17}H_{20}N_2O_4$: % C, 64.54; % H, 6.37; % N, 8.86. Found: % C, 64.40; % H, 6.49; % N, 8.85.

*Example 2*

A solution of 5.4 g. of pyridoxal and 6.1 g. of ethyl dl-aspartate in 200 cc. of absolute alcohol was shaken with 0.15 g. of Adams' platinum catalyst under 2–3 atmospheres of hydrogen. The hydrogenation required a little over an hour. The catalyst was removed by filtration and the filtrate was concentrated to dryness under diminished pressure to remove the water formed during the reaction. The residue, dissolved in 100 cc. of absolute alcohol, was treated with excess alcoholic hydrogen chloride, and ether was added to precipitate crystals of ethyl N-pyridoxyl-dl-aspartate dihydrochloride, which was obtained in a yield of 10.3 g. After two recrystallizations from alcohol-ether containing a little hydrogen chloride, the product melted at M. P. 167.5–168.5° C., with dec.; yield approximately 78% of theory. Anal. Calc'd for $C_{16}H_{26}N_2O_6Cl_2$: % C, 46.49; % H, 6.34; % N, 6.78. Found: % C, 46.74; % H, 6.39; % N, 6.48.

*Example 3*

A solution of potassium hydroxide was added slowly to a suspension of 0.89 g. of dl-alanine in 10 cc. of water, until a clear solution resulted. The residue, after removal of the water by freeze drying, was dissolved in 30 cc. of absolute alcohol and treated with 1.67 g. of pyridoxal which resulted in a bright yellow mixture. This mixture was shaken frequently during two hours. The yellow crystalline potassium salt of the Schiff base (pyridoxal dl-alanine), which precipitated, was filtered and washed with alcohol. This material (1.35 g.) in 125 cc. of absolute methyl alcohol was shaken with 0.1 g. of Adams' platinum catalyst under 2–3 atmospheres of hydrogen. The resulting colorless solution, after removal of the catalyst, was concentrated to dryness under reduced pressure, dissolved in absolute alcohol, and treated with alcoholic hydrogen chloride until the solution was acid to Congo red. The crystals which precipitated, were filtered and recrystallized from alcohol to produce 0.68 g. of N-pyridoxyl-dl-alanine hydrochloride; M. P. 202.5–203.0° C.; yield, approximately 50% of theory based on 1.35 g. of pyridoxal-dl-alanine: Anal. Calc'd for $C_{11}H_7N_2O_4Cl$: % C, 47.74; % H, 6.19; % N, 10.13. Found: % C, 47.64; % H, 5.87; % N, 10.14.

*Example 4*

3 grams of l-leucine and 1.28 g. of potassium hydroxide were shaken together in 125 cc. of methanol to give a clear solution. 3.82 g. of pyridoxal was added and a condensation took place quickly. The solution was shaken with 0.15 g. of Adams' platinum catalyst under 2–3 atmospheres of hydrogen. After removal of the catalyst by filtration, the filtrate was concentrated to dryness under reduced pressure, and the residue, dissolved in absolute alcohol, was acidified with alcoholic hydrogen chloride. The inorganic precipitate which appeared immediately was removed by filtration. N-pyridoxyl-l-leucine hydrochloride was precipitated by the addition of ether and after one recrystallization weighed 3.5 g.; M. P. 156–157°, yield approximately 48% of theory. Anal. Calc'd for $C_{14}H_{23}N_2O_4Cl$: % C, 52.74; % H, 7.27; % N, 8.79. Found: % C, 52.99; % H, 7.30: % N, 8.55.

*Example 5*

To a solution of 1.21 g. of l-cysteine and 0.56 g. of potassium hydroxide in 30 cc. of 80% alcohol was added 1.67 g. of pyridoxal and 60 cc. of 50% alcohol. The almost clear solution was filtered. Addition of ether caused slow precipitation of the potassium salt of pyridoxal-l-cysteine. The salt was acidified in aqueous solution to pH 6 with hydrochloric acid. Needles of pyridoxal-l-cysteine, which may be chemically designated as l-2-(2-methyl-3-hydroxy-5-hydroxymethyl-4-pyridyl)-4-thiazolidine-carboxylic acid, crystallized in a yield of 1.16 g.; yield approximately 43% of theory. After one recrystallization from alcohol the product melted at 149–150° C. Anal. Calc'd for $C_{11}H_{14}N_2O_4S$: % C, 48.88; % H, 5.22; % N, 10.37. Found % C, 49.18; % H, 5.14; % N, 10.21.

*Example 6*

A solution of 1.29 gms. of potassium hydroxide in 8 cc. of water was added to a suspension of 1.91 gms. of histidine hydrochloride in 10 cc. of water. 1.67 gms. of pyridoxal was added to the clear solution with the production of a bright orange color which began to fade immediately. The solution was diluted with 150 cc. of ethyl alcohol and the resulting mixture allowed to stand for approximately 2 hours. The white solid material which precipitated was then recovered by filtration, washed well with ethyl alcohol and then with ether. The crude product was dissolved in water, the solution cooled in an ice bath and 6 normal hydrochloric acid was added until the pH of the solution was approximately 4. The small amount of the material that did not go into solution was removed by filtration, and the filtrate was cooled in ice. The thick white precipitate which formed was filtered and washed with water and then alcohol and ether to produce 0.7 gm. of substantially pure pyridoxal-d-histidine, which may be chemically designated as d-4-(2-methyl-3-hydroxy-5-hydroxymethyl-4-pyridyl)-1-imidazo[c]tetrahydropyridine-6-carboxylic acid; M. P. 207–208° C. dec.; yield approximately 22% of theory.

*Example 7*

2.27 gms. of dl-alanine was suspended in 250 cc. of absolute methyl alcohol and approximately 1 equivalent of potassium hydroxide was added to the resulting suspension. The suspension was stirred until the alanine was dissolved and then 8.00 gms. of pyridoxal was added. The dark yellow solution, which was clear in less than three minutes was filtered, diluted to approximately 300 cc. and shaken under 2–3 atmospheres of hydrogen with 0.3 gm. of Adams' platinum catalyst. After the theoretical amount of hydrogen had been absorbed the catalyst was removed by filtration. The colorless solution was cooled in an ice bath and treated with alcoholic hydrogen chloride until the pH was about 6. Potassium chloride precipitated immediately upon the addition of the hydrogen chloride and was removed at once by filtration. Chloride-free N-pyridoxyl-dl-alanine crystallized from the filtrate slowly and was recovered by filtration and was washed with methyl alcohol and ether to produce substantially pure N-pyridoxyl-dl-alanine; M. P. 213–214° C. dec.; yield approximately 78% of theory. Anal. Calc'd for $C_{11}H_{16}N_2O_4$: % C, 54.99; % H, 6.71; % N. 11.66. Found: % C, 54.82; % H, 6.99; % N, 11.72.

*Example 8*

10.0 gms. of l-tyrosine was suspended in 250 cc. of absolute alcohol, slightly more than the theoretical amount of potassium hydroxide was added and the suspension was stirred until the tyrosine had dissolved. 9.24 gms. of pyridoxal was added. The dark yellow solution which was clear in about 3 minutes was filtered and diluted to 300 cc. with methyl alcohol. 0.3 gm. of Adams' platinum catalyst was added and the resulting mixture shaken under 2–3 atmospheres of hydrogen until the theoretical amount of hydrogen had been absorbed. The resulting mixture was worked up substantially as described in Example 1 to produce 17.5 gms. of N-pyridoxyl-l-tyrosine; M. P. 242–250° C. dec.; yield approximately 96% of theory. Anal. Calc'd for $C_{17}H_{20}N_2O_5$: % C, 61.43; % H, 6.07; % N, 8.43. Found: % C, 61.15; % H, 6.34; % N, 8.50.

Example 9

3.54 gms. of glycine was suspended in 250 cc. of absolute methyl alcohol and 1 equivalent of potassium hydroxide was added and the suspension stirred until the glycine had dissolved. 7.9 gms. of pyridoxal was added. The dark yellow solution which was clear in less than 3 minutes was filtered and diluted to approximately 300 cc. volume with absolute methyl alcohol, 0.3 gm. of Adams' platinum catalyst was added and the resulting mixture was shaken under 2–3 atmospheres of hydrogen until the theoretical amount of hydrogen had been absorbed. The reaction mixture was worked up substantially as described in Example 1 and the product dried at approximately 130° C. to produce approximately 4.9 g. of N-pyridoxyl-glycine; M. P. 228–229° C. dec.; yield approximately 46% of theory. (The reduction and condensation steps took place in substantially quantitative yields, the reduction in yield being due to washing the product with water.) Anal. Calc'd for $C_{10}H_{14}N_2O_4$: % C, 53.09; % H, 6.24; % N, 12.39. Found: % C, 53.29; % H, 6.25; % N, 12.28.

Example 10

10.0 gms. of dl-norleucine was suspended in 250 cc. of absolute methyl alcohol and approximately 1 equivalent of potassium hydroxide was added and the resulting suspension stirred until the norleucine had dissolved. 12.75 gms. of pyridoxal were added. The dark yellow solution which was clear in less than about 3 minutes was filtered, diluted to approximately 300 cc. with absolute methyl alcohol 0.3 gm. of Adams' platinum catalyst were added and the resulting mixture shaken under approximately 2–3 atmospheres of hydrogen until approximately the theoretical amount of hydrogen had been absorbed. The reaction mixture was worked up substantially as described in Example 1, to produce approximately 4.5 gms. of N-pyridoxyl-dl-norleucine; M. P. 220–221° C.; yield approximately 21% of theory (the condensation and reduction steps took place in substantially quantitative yields, the reduction in yield being due to washing the product with water). Anal. Calc'd for $C_{14}H_{22}N_2O_4$: % C, 59.55; % H, 7.86; % N, 9.92. Found: % C, 59.59; % H, 7.79; % N, 9.94.

Example 11

4.23 gms. of l-leucine were suspended in 250 cc. of absolute methyl alcohol and approximately 1 equivalent of potassium hydroxide was added and the resulting suspension was stirred until the leucine had dissolved. 5.4 gms. of pyridoxal were added. The dark yellow solution was clear in less than about 3 minutes and was filtered and diluted to about 300 cc. with absolute methyl alcohol, 0.3 gm. of Adams' platinum catalyst was added and the resulting mixture was shaken under 2–3 atmospheres of hydrogen until approximately the theoretical amount of hydrogen had been absorbed. The reaction mixture was worked up substantially as described in Example 1 to produce 0 65 gm. of N-pyridoxyl-l-leucine; M. P. 228°–229° C. dec.; yield approximately 7% of theory (the condensation and reduction steps took place in substantially quantitative yield, the reduction in yield being caused by washing the product with water). Anal. Calc'd for $C_{14}H_{22}N_2O_4$: % C., 59.55; % H, 7.86; % N. 9.92; Found: % C, 59.3; % H, 7.71; % N, 10.10.

Example 12

10.0 gms. of dl-leucine was suspended in 250 cc. of absolute methyl alcohol and approximately 1 equivalent of potassium hydroxide was added and the resulting suspension stirred until the leucine had dissolved. 12.74 gms. of pyridoxal was added, and the dark yellow solution which resulted was clear in less than 3 minutes. This solution was filtered and diluted to 300 cc. with absolute methyl alcohol. 0.3 g. of Adams' platinum catalyst was added and the resulting mixture was shaken under 2–3 atmospheres of hydrogen until approximately the theoretical amount of hydrogen had been absorbed. The reaction mixture was worked up substantially as described in Example 1 to produce approximately 13.7 gms. of N-pyridoxyl-dl-leucine; M. P. 232°–233° C.; yield approximately 64% of theory (the condensation and reduction steps took place in substantially quantitative yields and the reduction in yield being due to loss during the washing of the product with water). Anal. Calc'd for $C_{14}H_{22}N_2O_4$: % C, 59.55; % H. 7.86; % N, 9.92. Found: % C, 59.53; % H, 7.85; % N. 9.69.

Example 13

10.0 gms. of dl-isoleucine was suspended in 250 cc. of absolute methyl alcohol, approximately 1 equivalent of potassium hydroxide was added and the suspension was stirred until the isoleucine had dissolved. 12.74 gms. of pyridoxal was added and the dark yellow solution which resulted was clear in less than about 3 minutes. The solution was filtered and diluted to about 300 cc. with absolute methyl alcohol. 0.3 gm. of Adams' platinum catalyst was added and the mixture was shaken under 2–3 atmospheres of hydrogen until the theoretical amount of hydrogen had been absorbed. The reaction mixture was worked up substantially as described in Example 1 to produce 3.51 gms. of N-pyriodxyl-dl-isoleucine; M. P. 222–223° C. dec.; yield approximately 16% of theory (the condensation and reduction steps took place in substantially quantitative yields, the reduction in yield being due to loss during the washing of the product with water). Anal. Calc'd for $C_{14}H_{22}N_2O_4$: % C, 59.55; % H, 7.86; % N, 9.92. Found: % C, 59.69; % H, 8.08; % N, 9.81.

Example 14

9.9 gms. of dl-valine was suspended in 250 cc. of absolute methyl alcohol, converted to the potassium salt by reaction with potassium hydroxide and the potassium salt reacted with about 14.1 gms. of pyridoxal. The Schiff base was hydrogenated, and the reaction mixture worked up substantially as described in Example 1 to produce approximately 19 0 gms. of N-pyridoxyl-dl-valine; M. P. 245–246° C. dec.; yield approximately 84% of theory (the condensation and reduction steps took place in substantially quantitative yield, the reduction in yield being due to loss during the washing of the product with water). Anal. Calc'd. for $C_{13}H_{20}N_2O_4$; % C, 58.19, % H, 7.51; % N, 10.44. Found: % C, 57.86; % H, 7.51; % N, 10.35.

Example 15

Nine different N-pyridoxyl-amino acids were prepared utilizing substantially the same procedure as that described in Example 1, starting with pyridoxal and the potassium salt of the corresponding amino acid. The yield of N-pyridoxyl-amino acid obtained in each case, and the melting point and analytical data for the product are summarized in the following table:

| Product | Yield, Per Cent of Theory | M. P. (dec.), °C. | Empirical Formula | | Analysis | | |
|---|---|---|---|---|---|---|---|
| | | | | | Per Cent C | Per Cent H | Per Cent N |
| N-pyridoxyl-dl-tryptophane | 95 | 240–241 | $C_{19}H_{21}N_3O_4$ [1] | Calc'd | 64.21 | 5.96 | 11.82 |
| | | | | Found | 64.48 | 5.95 | 11.67 |
| N-pyridoxyl-dl-threonine | [2] 82 | 239–240 | $C_{12}H_{18}N_2O_5$ | Calc'd | 53.32 | 6.71 | 10.37 |
| | | | | Found | 53.19 | 6.53 | 10.46 |
| N-pyridoxyl-dl-glutamic acid | [2] 13 | 188–189 | $C_{13}H_{18}N_2O_6$ [3] | Calc'd | 52.34 | 6.08 | 9.39 |
| | | | | Found | 52.53 | 6.12 | 9.50 |
| N-pyridoxyl-dl-methionine [4] | [2] 10 | 217–218 | $C_{13}H_{20}N_2O_4S$ [3] | Calc'd | 51.98 | 6.71 | 9.33 |
| | | | | Found | 52.17 | 6.77 | 9.20 |
| N-pyridoxyl-dl-aspartic acid | 20 | 227–228 | $C_{12}H_{16}N_2O_6$ | Calc'd | 50.70 | 5.67 | 9.86 |
| | | | | Found | 50.72 | 5.54 | 9.81 |
| N-pyridoxyl-d-asparagine [5] | 21 | 209–210 | $C_{12}H_{17}N_3O_5$ | Calc'd | 50.87 | 6.05 | 14.83 |
| | | | | Found | 50.66 | 5.81 | 14.63 |
| N-pyridoxyl-β-alanine | [2] 59 | 212–213 | $C_{11}H_{16}N_2O_4$ | Calc'd | 54.99 | 6.71 | 11.66 |
| | | | | Found | 54.89 | 6.50 | 11.54 |
| N-pyridoxyl-l-lysine [6] | | 211–213 | $C_{14}H_{23}N_3O_4$ | Calc'd | 56.55 | 7.80 | 14.13 |
| | | | | Found | 56.29 | 8.16 | 13.82 |
| N-pyridoxyl-l-glutamic acid [7] | [2] 31 | 181–182 | $C_{13}H_{18}N_2O_6$ | Calc'd | 52.34 | 6.08 | 9.39 |
| | | | | Found | 52.21 | 6.02 | 9.28 |

[1] Dried at 150° C.
[2] The low yield obtained in preparing these compounds was due to losses which occurred during the washing of the product with water. The condensation and reduction steps took place in substantially quantitative yields.
[3] Dried at 130° C.
[4] The catalyst was 14 g. of 5% palladium on activated charcoal (Darco).
[5] Several hours were required for the reaction between the pyridoxal and the asparagine.
[6] Lysine monohydrochloride was used, and only enough potassium hydroxide to neutralize the hydrochloride. The crude product was dissolved in hot water, treated with activated charcoal (Darco) filtered, and precipitated by the addition of ethyl alcohol. The resulting material was then collected on a filter and washed with water as described in Example 1.
[7] Alcoholic hydrogen chloride was added to the reduced solution until a thick precipitate appeared; the solution was more acid than pH 6. Additional amounts of crude material were obtained by addition of ether to the alcoholic filtrate. The fractions were combined and washed with water.

Example 16

A solution of 3.8 gms. of butyl l-tyrosine and 2.7 gms. of pyridoxal in 200 cc. of absolute alcohol was shaken with 0.15 gm. of Adams' platinum catalyst under 2–3 atmospheres of hydrogen. Hydrogenation was substantially complete in approximately 1 hour. The catalyst was removed by filtration and the filtrate evaporated to small volume. The free amine crystallized from this concentrated alcoholic solution upon the addition of water thereto and was recovered by filtration and purified by recrystallization three times from water (including one decolorization using activated charcoal) and the product dried at 61° C. to produce approximately 4.1 gms. of butyl N-pyridoxyl-l-tyrosine; M. P. 141–142° C.; yield approximately 66% of theory. Anal. Calc'd for $C_{21}H_{28}N_2O_5$: % C, 64.93; % H, 7.27; % N, 7.21. Found: % C, 65.21; % H, 7.11; % N, 7.26.

Example 17

A solution of 4.7 gms. of pyridoxal and 6.0 gms. of ethyl dl-glutamate in 200 cc. of absolute alcohol was shaken with 0.15 gm. of Adams' platinum catalyst under 2–3 atmospheres of hydrogen. The hydrogenation was substantially complete in approximately 1 hour. The catalyst was removed by filtration and the filtrate evaporated to small volume and treated with an excess of alcoholic hydrogen chloride. Ether was added to the resulting solution to precipitate crystals of ethyl N-pyridoxyl-dl-glutamate dihydrochloride, which was removed by filtration and purified by recrystallization from ethyl alcohol ether solution containing a little hydrogen chloride. The purified material was dried at 61° C. to produce 9.4 gms. of substantially pure ethyl N-pyridoxyl-dl-glutamate dihydrochloride; M. P. 155–156° C. dec.; yield approximately 79% of theory. Anal. Calc'd for $C_{17}H_{28}N_2O_6Cl_2$: % C, 47.78; % H, 6.60; % N, 6.56. Found: % C, 47.96; % H, 6.51; % N, 6.66.

Example 18

A solution of 0.88 gm. of pyridoxal and 0.32 gm. of ethyl dl-alanine in 200 cc. of absolute alcohol was shaken with 0.15 gm. of Adams' platinum catalyst under 2–3 atmospheres of hydrogen. The hydrogenation was substantially complete in approximately 1 hour. The catalyst was removed by filtration and the filtrate was evaporated to dryness under diminished pressure. The residual material was dissolved in water and extracted 4 times with ether. The ethereal solution was washed with water, dried over anhydrous sodium sulfate, concentrated and treated with an excess of alcoholic hydrogen chloride. The dihydrochloride which precipitated was recrystallized 3 times from alcohol ether and dried at 61° C. to produce approximately 0.53 gm. of ethyl-N-pyridoxyl-dl-alanine dihydrochloride; M. P. 180–181° C. dec.; yield approximately 30% of theory. Anal. Calc'd for $C_{13}H_{22}N_2O_4Cl_2$: % C, 47.75; % H, 6.50; % N, 8.21. Found: % C, 45.80; % H, 6.30; % N, 8.55.

Example 19

A solution of potassium hydroxide was added slowly to a suspension of 1.17 gms. of ε-benzoyl-dl-lysine in 10 cc. of water until a clear solution resulted. The residue, after removal of the water by freeze-drying, was dissolved in 30 cc. of absolute alcohol and treated with 0.83 gm. of pyridoxal. The resulting bright yellow mixture formed a clear solution in a half hour. This solution was evaporated to dryness under reduced pressure to produce the potassium salt of pyridoxal-(ε)-benzoyl-dl-lysine. This product was dissolved in 50 cc. of absolute ethyl alcohol and the solution shaken with 0.1 gm. of Adam's platinum catalyst under 2–3 atmospheres of hydrogen. The catalyst was removed by filtration and the resulting colorless solution was concentrated to 20 cc. volume. Alcoholic hydrogen chloride was added to this solution and the potassium chloride which precipitated immediately was removed by filtration. Halogen-free crystals of N-(α)-pyridoxyl-N-(ε)-benzoyl-dl-lysine were obtained by the addition of ether to the filtrate. This product was recrystallized twice from dilute ethyl alcohol and dried to produce substantially pure N-(α)-pyridoxyl-N-(ε)-benzoyl-dl-lysine; M. P. 220–221° C. dec.; yield approximately 27% of theory. Anal. Calc'd for $C_{21}H_{27}N_3O_5$: % C, 62.82; % H, 6.78; % N, 10.47. Found % C, 63.04; % H, 6.93; % N, 10.43.

Example 20

3.00 gms. of dl-serine and approximately 1 equivalent of potassium hydroxide were shaken in 70 cc. of methyl alcohol to give a clear solution. 4.78 gms. of pyridoxal were added and condensation took place quickly. This solution was diluted to 125 cc. with additional methyl alcohol and shaken with 0.15 gm. of Adams' platinum catalyst under 2–3 atmospheres of hydrogen until hydrogenation was substantially complete. The catalyst was removed by filtration and the filtrate was evaporated to dryness under reduced pressure. The residual material was dissolved in absolute alcohol, the solution acidified with alcoholic hydrogen chloride and the precipitate, which resulted (and which contained both organic and inorganic material) was filtered and dissolved in water. The resulting solution was adjusted to pH 6 with hydrochloric acid and the product, which crystallized out with 1 mole of water, was recovered by filtration and dried to produce approximately 4.4 gms. of N-pyridoxyl-dl-serine monohydrate; M. P. 217–218° C.; yield approximately 56% of theory. Anal. Calc'd for $$C_{11}H_{16}N_2O_5 \cdot H_2O$$

% C, 48.17; % H, 6.61; % N, 10.22. Found: % C, 48.53; % H, 6.62; % N, 10.34.

Example 21

0.39 gm. of l-dimethylcysteine hydrochloride and 0.254 gm. of potassium hydroxide were mixed with 30 cc. of 80% alcohol and to the resulting solution was added 0.33 gm. of pyridoxal and 60 cc. of 50% alcohol. The almost clear solution was filtered. Addition of ether to the solution containing the condensation product brought down crystals of pyridoxal l-dimethylcysteine, which may be chemically designated as 1-2-(2-methyl-3-hydroxy-5-hydroxymethyl-4-pyridyl) - 5,5-dimethyl - 4 - thiazolidinecarboxylic acid. These crystals were purified by washing with hot dilute alcohol in which they were insoluble. The product was then dried to produce approximately 0.40 gm. of substantially pure pyridoxal l-dimethylcysteine; M. P. 185–186° C.; yield approximately 73% of theory. Anal. Calc'd for $C_{13}H_{18}N_2O_4S$: % C, 52.33, % H, 6.08; % N, 9.39. Found: % C, 52.36; % H, 6.32; % N, 9.11.

Modifications may be made in carrying out the present invention without departing from the spirit and scope thereof and it is to be understood that the invention is to be limited only by the appended claims.

I claim:

1. The process of preparing N-pyridoxyl-amino acids and salts of N-pyridoxyl-amino acids which comprises reacting together, in solution in a lower aliphatic alcohol, pyridoxal and a compound selected from the class which consists of the alkali metal salts of the amino acids, phenyl alanine, α-alanine, β-alanine, tyrosine, glycine, norleucine, leucine, isoleucine, valine, tryptophane, threonine, glutamic acid, methionine, serine, aspartic acid, asparagine, lysine and N-(ε)-benzoyl-lysine to produce an alcoholic solution containing the corresponding alkali metal salt of the Schiff base condensation product of said pyridoxal and said amino acid, filtering said solution and subjecting the filtrate without further purification to the action of hydrogen in the presence of a platinum metal catalyst thereby reducing said salt of said Schiff base to produce a salt of the corresponding N-pyridoxyl-amino acid, and treating said latter salt with a mineral acid.

2. The process of preparing yellow Schiff base condensation products of pyridoxal and amino acids, characterized as being reactive with hydrogen in contact with a platinum hydrogenation catalyst, which comprises reacting together, in solution in a lower aliphatic alcohol, pyridoxal and a compound selected from the class which consists of the alkali metal salts of the amino acids, phenyl alanine, α-alanine, β-alanine, tyrosine, glycine, norleucine, leucine, isoleucine, valine, tryptophane, threonine, glutamic acid, methionine, serine, aspartic acid, asparagine, lysine and N-(ε)-benzoyl-lysine to produce an alcoholic solution containing the corresponding alkali metal salt of the pyridoxal-amino acid Schiff base condensation product of said pyridoxal and said amino acid, filtering said solution, evaporating the alcohol therefrom and treating the resulting salt with a mineral acid.

3. N-pyridoxyl-amino acids having the formula:

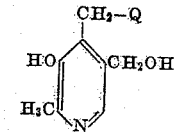

wherein Q is a radical resulting from the removal of one of the hydrogens attached to an amino grouping of an amino acid selected from the class which consists of phenyl alanine, α-alanine, β-alanine, tyrosine, glycine, norleucine, leucine, isoleucine, valine, tryptophane, threonine, glutamic acid, methionine, serine, aspartic acid, asparagine, lysine and N-(ε)-benzoyl-lysine.

4. Alkali metal salts of N-pyridoxyl-amino acids having the formula:

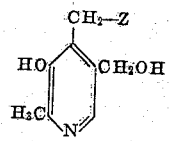

wherein Z is a radical resulting from the removal of one of the hydrogens attached to an amino grouping of an alkali metal salt of an amino acid selected from the class which consists of phenyl alanine, α-alanine, β-alanine, tyrosine, glycine, norleucine, leucine, isoleucine, valine, tryptophane, threonine, glutamic acid, methionine, serine, aspartic acid, asparagine, lysine and N-(ε)-benzoyl-lysine.

5. Mineral acid salts of N-pyridoxyl-amino acids having the formula:

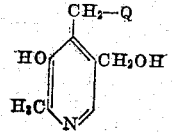

wherein Q is a radical resulting from the removal of one of the hydrogens attached to an amino grouping of an amino acid selected from the class which consists of phenyl alanine, α-alanine, β-alanine, tyrosine, glycine, norleucine, leucine, isoleucine, valine, tryptophane, threonine, glutamic acid, methionine, serine, aspartic acid, asparagine, lysine and N-(ε)-benzoyl-lysine.

6. N-pyridoxyl-dl-alanine.
7. N-pyridoxyl-glycine.
8. N-pyridoxyl-l-tyrosine.

9. The process of preparing N-pyridoxyl-dl-alanine which comprises reacting together, in solution in absolute methanol, pyridoxal and the potassium salt of dl-alanine to produce a methanol solution containing the potassium salt of pyridoxal-dl-alanine, filtering said solution and subjecting the filtrate without further purification to the action of hydrogen in the presence of platinum catalyst, and treating the hydrogenation product with an acid.

10. The process of preparing N-pyridoxyl-glycine which comprises reacting together, in solution in absolute methanol, pyridoxal and the potassium salt of glycine to produce a methanol solution containing the potassium salt of pyridoxal-glycine, filtering said solution and subjecting the filtrate without further purification to the action of hydrogen in the presence of platinum catalyst, and treating the hydrogenation product with an acid.

11. The process of preparing N-pyridoxyl-l-tyrosine which comprises reacting together, in solution in absolute methanol, pyridoxal and the potassium salt of l-tyrosine to produce a methanol solution containing the potassium salt of pyridoxal-l-tyrosine, filtering said solution and subjecting the filtrate without further purification to the action of hydrogen in the presence of platinum catalyst, and treating the hydrogenation product with an acid.

DOROTHEA HEYL HOFFMAN.

REFERENCES CITED

The following references are of record in the file of this patent:

Richter: Textbook of Organic Chemistry, pp. 502 and 235 (1938).

Snell: J. Biol. Chem. 154 313–314 (1944).

Degering et al.: An Outline of Organic Nitrogen Compounds (1945), page 232, University Lithoprinters, Ypsilanti, Mich.